E. SAMUEL & V. ANGERER.

RAILWAY SWITCH.

No. 11,518. Reissued Dec. 10, 1895.

Witnesses:
Chas. Debou.
Fred. B. Benders

Inventors:
Edward Samuel and
Victor Angerer
by their Attorneys
Howson & Howson

UNITED STATES PATENT OFFICE.

EDWARD SAMUEL AND VICTOR ANGERER, OF PHILADELPHIA, PENNSYLVANIA, ASSIGNORS TO THE WILLIAM WHARTON, JR., & COMPANY, INCORPORATED, OF SAME PLACE.

RAILWAY-SWITCH.

SPECIFICATION forming part of Reissued Letters Patent No. 11,518, dated December 10, 1895.

Original No. 545,820, dated September 3, 1895. Application for reissue filed November 7, 1895. Serial No. 568,244.

*To all whom it may concern:*

Be it known that we, EDWARD SAMUEL and VICTOR ANGERER, citizens of the United States, and residents of Philadelphia, Pennsylvania, have invented certain Improvements in Railway-Switches, of which the following is a specification.

The main object of our invention is to so mount the pivoted tongue on the switch structure that it can be readily removed without disturbing the street, and a further object of the invention is to give the tongue more stability, as fully described hereinafter.

Figure 1:
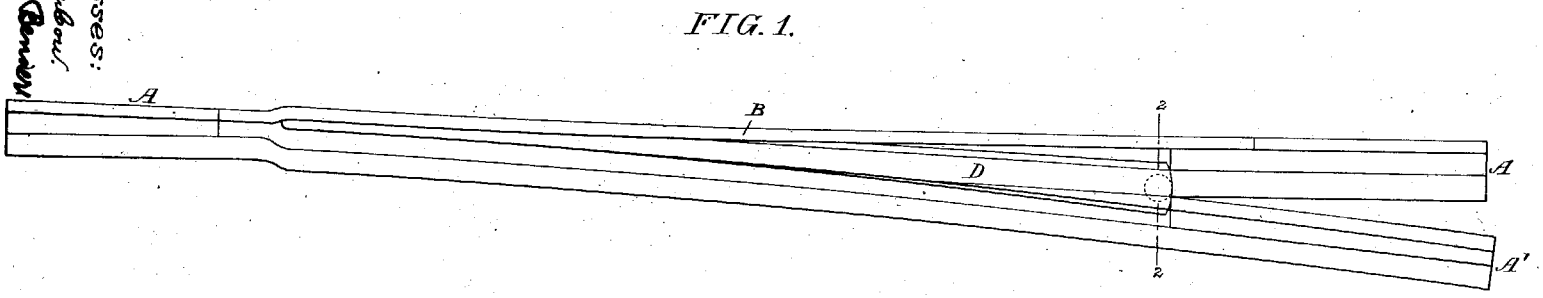
Figure 3:
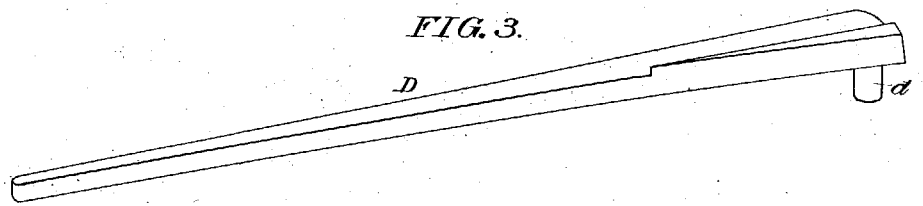
Figure 4:
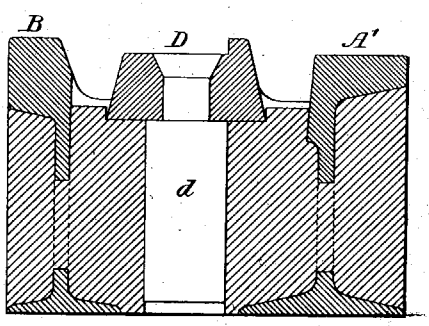
Figure 2:
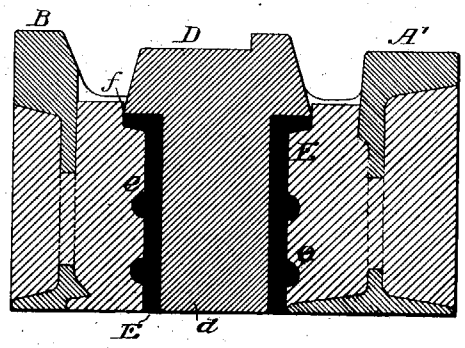

In the accompanying drawings, Figure 1 is a plan view of our improved switch structure. Fig. 2 is a transverse sectional view on the line 2 2, Fig. 1. Fig. 3 is a detached perspective view of the switch-tongue, and Fig. 4 is a transverse sectional view showing a modification of our invention.

A is one of the rails of the main track, and A′ is one of the rails of the turn-out.

B is the guard-rail, bent, as shown in Fig. 1, so that when the tongue D is moved against the guard-rail it will have the longest possible thrust bearing between its point and root against the inner surface of said rail. The tongue D, in the present instance, is much wider at the base than at the top, so as to give it stability. The taper is carried from the root to a point on each side where the tongue rests against the guard or rail. Projecting from the root of the tongue D is a pivot-pin *d*, made integral with the tongue, as shown in Fig. 2, or fastened thereto, as shown in Fig. 4. This pivot-pin *d* extends into a hole in the switch structure. The tongue simply rests upon the switch structure, the pin keeping it in proper position. Ordinarily switch-tongues are secured by pivot-bolts in such manner that the street has to be torn up in order to repair the tongue. Owing to the peculiar shape of the tongue and the neat fit of the pin any strains or knocks to which the tongue may be subjected will not dislodge it, and it cannot be readily removed from the switch structure without it is lifted up perfectly straight. With a suitable appliance, however, it can be readily removed, making it feasible to remove the tongue without disturbing any other part of the switch or the street-surface. In order to provide a snugly-fitting bearing for the pivot-pin *d*, the opening in the switch structure is made larger than the pin, and when the tongue is adjusted in the proper position molten metal is poured into the space between the pin and the base, forming a bearing E. We also form a recess *f* underneath the wide part of the tongue and fill this with molten bearing metal, thus giving a good bearing to the tongue at the wide end.

The molten metal we prefer to use is phosphor-bronze or some other suitable bearing metal.

One or more channels *e* are made in the switch-base, which will prevent the bearing for the pin becoming loose in the structure. Pins or holes may be substituted for the channels or the opening may be undercut.

In the present instance we have shown a switch structure having independent rails secured together by cast blocks, so that the opening for the pivot-pin can be made at the same time that the blocks are cast. It will be understood, however, that any other switch structure may be used.

We claim as our invention—

1. The combination of the switch structure, a pivot opening therein, a switch tongue wider at the base than at the top and having a pivot pin depending therefrom and adapted to snugly fit the opening in the switch structure and held in position simply by the weight of the tongue and by the snug fit of the pin, substantially as described.

2. The combination of the switch structure, an opening therein, a switch tongue having a pin, the opening in the switch structure being larger than the pin, with metal cast in the opening and around the pin, said cast metal being locked to the switch structure so that the pin will turn within the cast metal bushing, substantially as described.

EDWARD SAMUEL.
VICTOR ANGERER.

Witnesses:
ISAAC L. HORN,
LOUIS KOPPENHOEFER.